United States Patent [19]

Urbanski

[11] Patent Number: 4,658,263

[45] Date of Patent: Apr. 14, 1987

[54] DUAL ANTENNA FOR MAGNETIC MARKERS

[75] Inventor: Jeffrey C. Urbanski, Sparta, N.J.

[73] Assignee: Allied Corporation, Morris Township, Morris County, N.J.

[21] Appl. No.: 700,257

[22] Filed: Feb. 11, 1985

[51] Int. Cl.$^4$ .................. H01Q 1/36; H01Q 7/08; G08B 13/26
[52] U.S. Cl. ............................ 343/788; 343/895; 343/572
[58] Field of Search ............ 343/701, 742, 787, 788, 343/895; 333/175; 340/572

[56] References Cited

U.S. PATENT DOCUMENTS

| | | | |
|---|---|---|---|
| 3,683,389 | 8/1972 | Hollis | 343/742 |
| 3,790,945 | 2/1974 | Fearon. | |
| 3,852,755 | 12/1974 | Works et al. | 343/701 |
| 4,510,489 | 4/1985 | Anderson, III et al. | |

Primary Examiner—Eli Lieberman
Attorney, Agent, or Firm—Ernest D. Buff; Gerhard H. Fuchs

[57] ABSTRACT

A dual antenna is provided for energizing and receiving a response from a closely coupled marker providing an identifiable signal. An elongated drive coil is wound on a substantially flat winding template and defines a longitudinal axis of the antenna. Each winding of the drive coil extends in a plane substantially perpendicular to the longitudinal axis. A receive coil has at least one elongated loop extending substantially parallel to the antenna axis with a first portion of the loop being overlaped by the drive coil; said first portion extending substantially perpendicular to the longitudinal axis of the antenna. One portion of the receive coil is outside the drive coil; the drive coil being substantially the same length as the marker with the receive coil being substantially as wide as the marker to optimize the signal. In one embodiment, a plurality of receive coil loops is provided to decrease the longitudinal sensitivity. Preferably, the winding template includes a U-shaped slot for receiving the first portion of the receive coil and a reduced section to receive the second portion. The template is preferably magnetic barium ferrite mixed with a plastic binder to provide a dc bias field for activation the marker. In additional embodiment, multiple receive coils are provided side-by-side to allow simultaneous reading of multiple ribbon marker.

24 Claims, 8 Drawing Figures

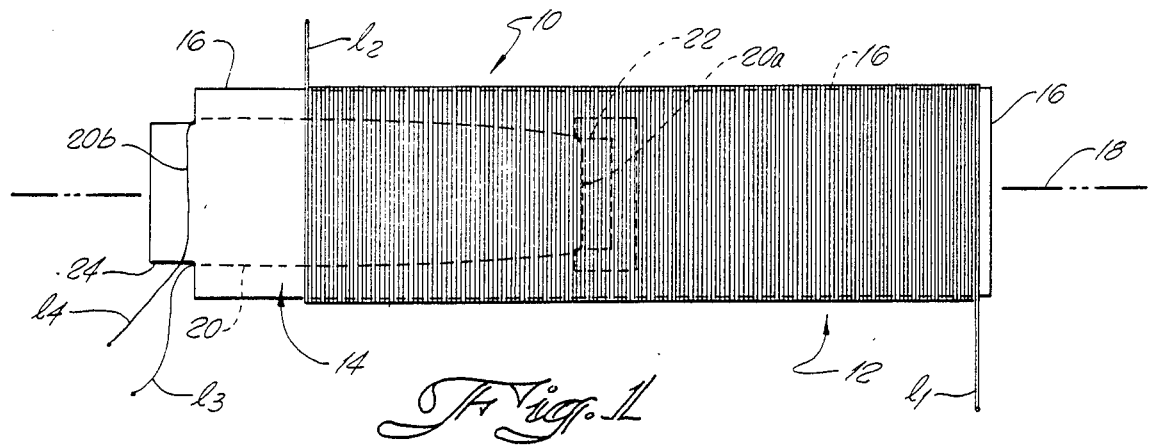
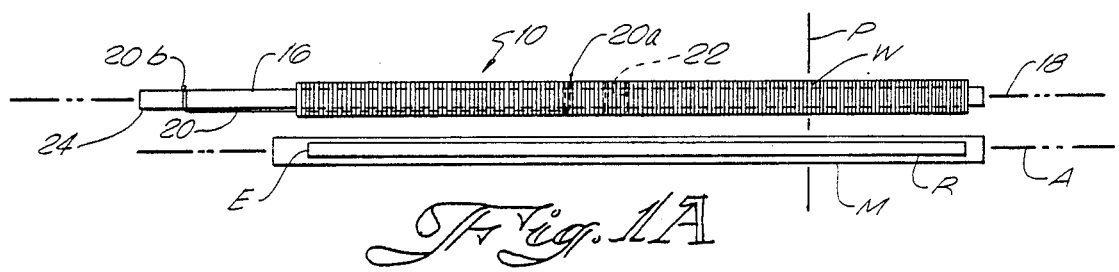
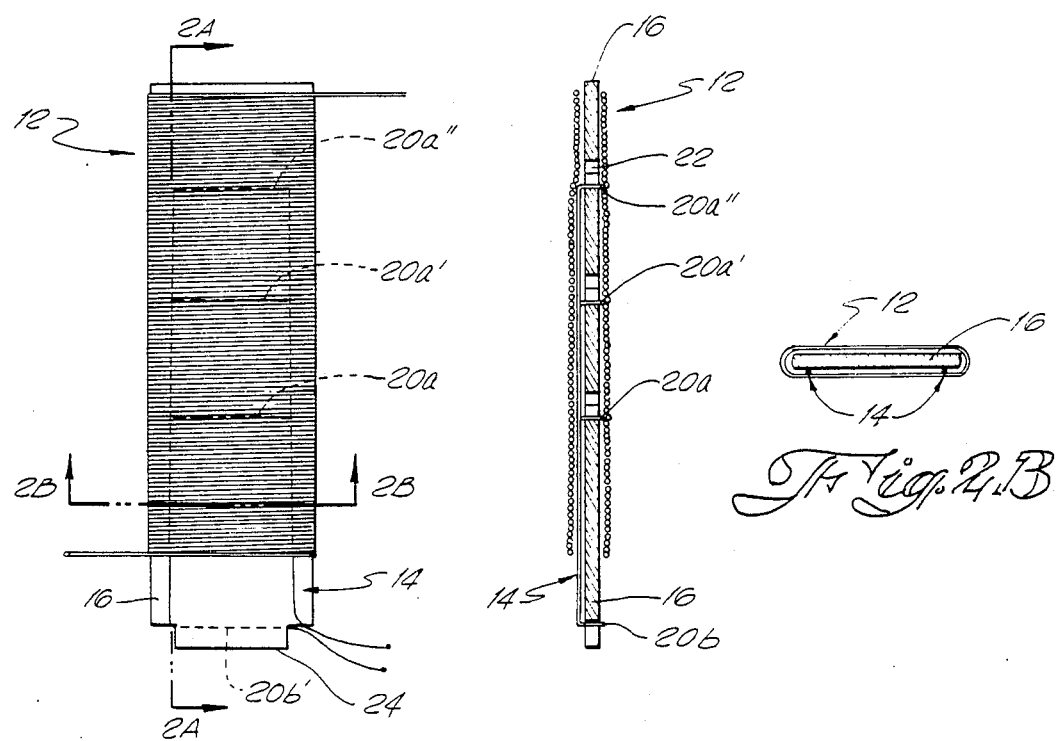

DUAL ANTENNA FOR MAGNETIC MARKERS

TECHNICAL FIELD

This invention relates generally to a dual purpose antenna for interrogating and reading markers. More particularly, the invention provides a compact, thin antenna including a drive and receive coil for use in devices capable of energizing, reading and verifying a correctly oriented, closely coupled marker.

BACKGROUND OF THE INVENTION

A recent study by the U.S. International Trade Commission indicates that counterfeiting of name brand goods is presently costing American businesses up to 8 billion dollars in lost sales annually. In addition, the counterfeiting is effectively costing the work force some 131,000 jobs per year. Still more startling is the fact that the counterfeiting menace is increasing. The growth of counterfeiting, however, should be easy to understand when the huge profits obtainable by the counterfeiter on the sale of low quality bonus goods at name brand prices are considered.

In order to combat the counterfeiting problem, technologies have developed for placing an identifiable marker or tag on the name brand goods. Of course, the markers themselves must be made very difficult to counterfeit in order to be effective. Typically, the marking system is designed so that at the least the cost of breaking the code and reproducing the marker or tag is prohibitive to the counterfeiter. However, on the other hand, the markers and the identifying system must be produced at a relatively low cost so as to make the concept economically feasible to the brand name manufacturer seeking bq protect its product.

An example of a tagging or marking system is found in U.S application of Anderson et al, patent Ser. No. 373,061 filed Apr. 29, 1982 now U.S. Pat. No. 4,510,489, entitled Survillance Systems Having Magneto Mechanical Marker. The marker includes an amorphous ferromagnetic strip or ribbon target adapted to generate a specific identifiable signal in response to interrogation with an applied magnetic field. The resonance frequency of the response signal is known since it is a function of the amorphous metal composition and the length of the ribbon.

As shown in the Anderson et al application, markers of this kind are presently used in theft detection systems. A transmitting apparatus including a drive coil is situated on one side of a passage leading to an exit from the premises. A receiving coil is positioned at the opposite side of the passage. The drive coil produces an interrogation signal that energizes the target ribbon. Once energized, the target ribbon produces an identifiable response signal that is received by the receiving coil. The presence of the response signal indicates that the target has not been properly deactivated or removed from the marked article by the cashier.

In such a theft detection system, the drive and receive coils of the antenna are spaced apart the width of the passageway, possibly as much as six feet. Thus, the interrogation zone defined between the drive and receive coils is quite large. The drive coil must, therefore, be adapted to apply a wide, strong magnetic interrogation field in order to energize and detect targets in the passageway leading to the exit.

If targets of this type are to be adapted for product verification, it is desirable to have a large number of different marker codes to prevent or discourage counterfeiting of the markers. One way we have discovered to do this is through the use of one or more amorphous ribbons of different length in each marker; each ribbon resonating in response to the interrogation field at a different identifiable frequency. However, where a wide range drive coil is used to interrogate the targets in the prior art, only the presence of the different frequency ribbons (in no particular sequence) may be determined. We have found there is n previously-known way to determine the order or sequence of the ribbons in the marker.

Thus, a need is identified for a short range, narrow interrogation zone antenna allowing for efficient scanning and detection of identification markers. Further, an integral, dual purpose antenna is desired capable of detecting the order or sequence of different frequency signal producing ribbon targets in a marker. Such an antenna allows for a greater number of marker codes as the multiple ribbons may be lined up side-by-side and read in sequence. Where original manufactured articles are properly marked, any variation in the frequencies present, or in the order of the frequencies, indicates that the marked article is a counterfeit. Such an antenna also has ready application to other security devices where an increased number of codes is desirable, such as in card reading devices, remote control locks, article surveillance devices, and personal identification systems.

SUMMARY OF THE INVENTION

Briefly stated, the composite antenna of the present invention is characterized by dual coils wound in a substantially flat configuration and overlapping so as to provide a relatively narrow interrogation zone and short overall interrogation range. Specifically, the antenna includes a drive and receive coil adapted to transmit an interrogation field in a narrow band for energizing a closely coupled target ribbon of a marker, and receiving the response signal produced by the marker. The antenna may for example be utilized in a product verification device to energize a magnetomechanical marker, such as disclosed and claimed in the aforsaid co-pending application said Ser. No. 373,061, filed Apr. 29, 1982, and in co-pending application Ser. No. 384,814, filed June 3, 1982 entitled Coded Surveillance System Having Magnetomechanical Marker, Ser. No. 373,061, filed Apr. 29, 1982.

Advantageously, a reader equipped with the antenna of the present invention is capable of distinguishing multi-ribbon/multi-frequency markers not only by the frequencies of the signals produced in response to the applied magnetic interrogation field as in the prior art, but also by the sequence or order of the frequencies. Thus, the antenna of the present invention greatly increases the number of available marker codes that may be distinguished, thereby greatly reducing the feasibility of counterfeiting the marker.

The antenna includes a substantially flat drive coil and an overlapping receive coil having at least one loop. The individual winding turns of the drive coil each extend in a plane substantially perpendicular to the longitudinal axis of the antenna. The loop of the receiving coil extends in a plane parallel to the longitudinal axis of the antenna with only one portion of the loop overlapping the drive coil. Since the drive and receive coils are substantially perpendicular to each other, transformer action is small and electromagnetic noise is reduced. As a consequence, the response signal-to-noise ratio provided by the antenna of the present invention is greatly improved over that available with prior art antennae wherein the drive and receive coils are positioned in substantially parallel planes.

Maximum performance of the antenna is further assured by providing a drive coil having a length substantially equal to the length of the marker being interrogated. Additionally, the receive coil loop should be approximately the width of the target ribbon to maximize the signal-to-noise ratio and flux line crossings.

Preferably, the receive coil includes multiple loops having a common end that does not cross the drive coil. Each loop extends a different length along the longitudinal axis of the drive coil. Thus, the receive coil loops serve to divide the antenna into segments. Such a multiple receive coil loop structure advantageously serves to decrease the longitudinal sensitivity of the antenna relative to the target ribbon. This is because the receive coil functions as long as the marker is positioned adjacent to and in a plane parallel to the receive coil but remains remote from the common end of the receive coil loops.

The drive and receive coils may also be wound on a common template so as to improve the assembly efficiency. The template includes a substantially U-shaped slot structure for receiving and retaining the portion of the receive coil that extends across the drive coil. The drive coil may then be wound around that portion of the loop and the template.

The antenna may also include a series of receive coils positioned side-by-side transversely across the template. A single drive coil is then wrapped around the receive coils and the template except for that portion of each receive coil that must remain remote from the drive coil. An antenna of this structure allows the interrogation of properly oriented multi-ribbon/multi-frequency targets in sequence with a single operation.

Preferably, the template is composed of a non-metallic magnetic material such as barium ferrite mixed with a plastic binder. Such a material has a high coercivity and provides the bias field necessary to activate the magnetomechanical target ribbon. As a consequence, markers may be produced without separate biasing elements, thereby reducing the manufacturing costs of each marker. Further, it should be recognized that the structure of the antenna of the present invention provides the closest possible coupling of the received coil, drive coil, and bias plate to the target thereby enhancing antenna efficiency.

BRIEF DESCRIPTION OF THE DRAWINGS

The invention will be more fully understood and further advantages will become apparent when reference is made to the folowing detailed description of the preferred embodiment of the invention and the accompanying drawings in which:

FIG. 1 is a top plan view of an antenna constructed in accordance with the teachings of the present invention;

FIG. 1A is a side elevational view showing the antenna of the present invention positioned over a properly oriented target marker;

FIG. 2 is a top plan view of an alternative embodiment of the antenna of the present invention showing multiple receive coil loops;

FIG. 2A is a cross-sectional view of the antenna shown in FIG. 2 taken along line 2A—2A;

FIG. 2B is a cross-sectional view of the antenna shown in FIG. 2 taken along line 2B—2B;

DESCRIPTION OF THE PREFERRED EMBODIMENTS

Figure 3:
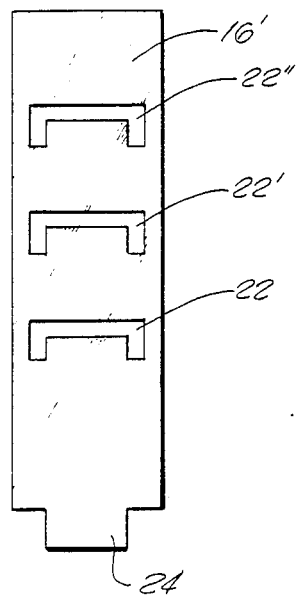
FIG. 3 is a top plan view of the winding template used in the antenna shown in FIG. 2.

Reference is now made to FIGS. 1 and 2 showing a dual antenna 10 constructed in accordance with the teachings of the present invention. The antenna 10 may be used in interrogating, detecting and identifying marker M, such as may be attached to a product or article that, for example, is to be protected from counterfeiting. As is known in the art, the marker M may include an elongated element of magnetostrictive, ferromagnetic material. The marker includes one or more magnetomechanical ferromagnetic ribbons R positioned within a holding container. The most desirable material for the ribbons R is the amorphous ferromagnetic compositions described and claimed in the copending application mentioned above.

The container is constructed so that the ribbon or ribbons remain unrestrained and undamped during use; i.e. the ribbon R is free to vibrate (note FIG. 1A). Each ribbon is then able to resonate mechanically at a preselected identifiable frequency in response to an applied electromagnetic interrogation field.

The antenna 10 is preferably elongated and approximates the size and shape of the marker M to be identified, and includes a drive coil 12 and a receive coil 14 wound about a template 16. The elongated drive coil 12 is wound in a substantially flat configuration along a longitudinal axis 18 of the antenna 10. Each individual winding of the drive coil 12 extends in a plane substantially perpendicular to the longitudinal axis 18 (note, for example, plane P containing individual winding W in FIG. 1A). Leads $l_1$ $l_2$ are provided for attachment to a signal generator (not shown).

The receive coil 14 is an elongated loop 20 extending in a plane substantially parallel to the longitudinal axis 18 of the antenna 10. Thus, the drive and receive coils 12, 14 overlap and the individual windings or loops of the coils are contained in planes substantially perpendicular to each other. Advantageously, transformer action is therefore small and electromagnetic noise is minimized.

As shown in dashed line outline in FIG. 1, the template 16 includes a U-shaped slot 22 for receiving and retaining a first portion 20a of the receive coil loop 20. A reduced portion 24 at a first end of the template 16 retains a second portion 20b of the receive coil loop 20. The drive coil 12 is then wound around the template 16 and overlaps or covers the first portion 20a of the receive coil loop 20. It should be recognized, however, that the drive coil 12 does not overlap, and is remote from the second portion 20b of the receive coil loop 20. Leads $l_3$, $l_4$, connect to a suitable receiver (not shown).

When the drive coil 12 is energized to produce an interrogation frequency of electromagnetic radiation, most of the magnetic field lines generated by the drive coil are concentrated inside the drive coil along the template 16. A relatively, weak magnetic field, however, is generated along the outside of the coil 12 parallel to the longitudinal axis 18. This weak field is capable of exciting a properly oriented and closely coupled target marker M at very short range.

As shown in FIG. 1A, antenna 10 is thus positioned adjacent to the marker M (within about 1") with the magnetostrictive marker plane substantially parallel to the plane of the receive coil 14 and substantially coextensive therewith. The drive coil 12 defined by the first and second receive coil loop portions 20a, 20b, respectively, is positioned adjacent a first end E of the ribbon R. The ribbon R thus extends only across the first portion 20a of the antenna maintained substantially parallel to the longitudinal axis A of the marker ribbon. Such an orientation of the antenna 10 with respect to the marker M, and, and proper receiving function.

The drive coil 12 provides a sufficient interrogation field to only excite the closely coupled, properly oriented ribbon R of the marker. Further, the receive coil 14 is only capable of receiving a response signal from an excited ribbon when the ribbon is positioned to lie adjacent to the first portion 20a of the receive coil. As a consequence, the antenna 10 is only capable of narrow, very close range operation, thereby allowing individual ribbons even of a multi-ribbon marker to be read one at a time. Thus, the antenna of the present invention could be used to differentiate multi-ribbon markers by the order in which the ribbons are provided on the marker.

FIGS. 2, 2A and 2B show an additional embodiment of the antenna 10 of the present invention for reducing the longitudinal sensitivity with respect to the positioning of the antenna relative to the marker ribbon R. As best shown in FIG. 3, the drive coil 12 is identical to the coil in the FIG. 1 embodiment. However, the template 16' for this embodiment included a series of three U-shaped slots 22, 22', 22" rather than one, as in FIG. 1. Each slot 22, 22', 22" receives and retains an individual receive coil loop 20. Each loop 20 is of a differing length having a common end 20b' and leads. The end 20b' is spaced a predetermined distance or remote from the drive coil 12.

Noting FIG. 2, the receive coil loops 20 are of proportional length so as to divide the antenna 10 into uniform segments. The receive coil 14 and, therefore, the antenna 10 function only so long as a properly oriented, closely coupled target ribbon R extends along the drive coil 12 adjacent to one of the first portions 20a, 20a' or 20a" of the receive coil loops. The common end 20b' remains remote from the ribbon. By providing multiple receive coil portions 20a, 20a', 20a" spaced along the drive coil 12, and antenna 10 constructed in accordance with this embodiment is capable of conveniently reading a wide range of ribbon lengths and longitudinal position sensitivity between the antenna and the ribbon is reduced.

Figure 4:
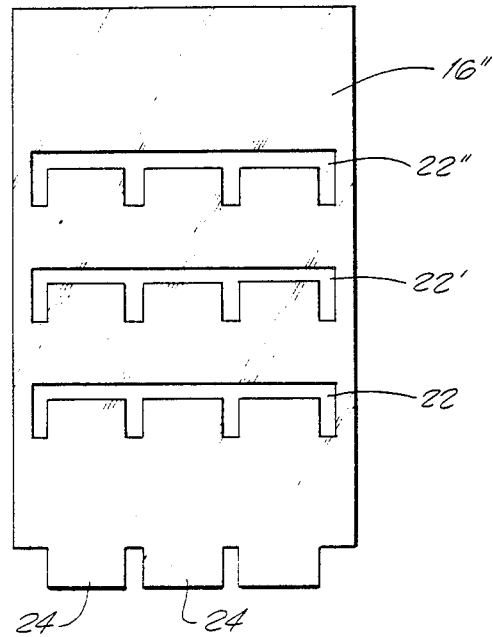
FIG. 4 is a top plan view of a winding template for use in an antenna capable of simultaneously indicating the response frequency sequence or order of multiple ribbons positioned side-by-side within a marker.
Figure 4A:
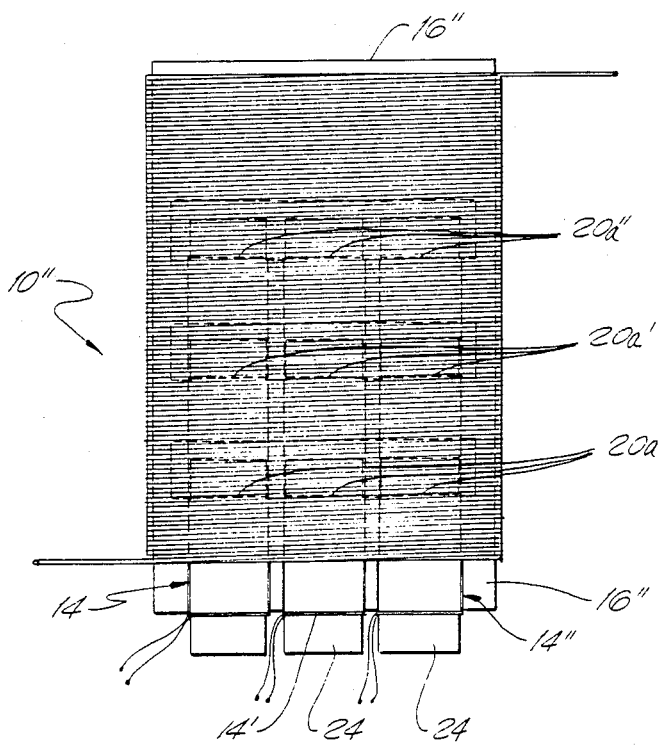
FIG. 4A is a top plan view showing the winding of the receive coil loops and drive coil around the template shown in FIG. 4.

FIGS. 4 and 4A show an additional embodiment for the antenna 10 of the present invention wherein a series of receive coils 14, 14', 14", such as shown in FIG. 2, are provided side-by-side transversely across the template 16". A single drive coil 12 is wound around the template 16" and the first portion 20a, 20a', 20a" or each receive coil 14, 14', 14". Advantageously, such an antenna 10" allows the simultaneous interrogation of multi-ribbon/multi-frequency markers in sequence. Each receive coil 14, 14', 14" is spaced so as to match the spacing between side-by-side ribbons in a marker. When the antenna 10" is activated over a closely coupled, properly oriented multi-ribbon marker each receive coil 20 receives a response signal from the adjacent excited ribbon marker M (as described above with respect to FIG. 1A). The signal received by each receive coil may then, of course, be processed separately. This allows the determination of the frequency sequence of the marker as applicable in product verification and card reading devices.

It should also be recognized that the templates 16, 16', 16" of each embodiment may be constructed so as to provide a built-in dc magnetic bias to activate the target marker M. Preferably, the template 16 is molded of a plastic binder material, such as polyethylene, having a ferromagnetic material with high coercivity characteristics, such as barium ferrite, dispersed therein. A suitable composition for the template is 20% barium ferrite and 80% polyethylene plastic by volume. The provision of a barium ferrite/plastic template 16 integral with the antenna 10 reduces the cost of the system since the markers may be manufactured without the addition of a separate biasing strip or ribbon.

In summary, numerous benefits result from employing the concepts of the present invention. An unique dual antenna 10 with overlapping drive/receive coils provides a relatively narrow interrogation zone and short overall interrogation range. The antenna provides the closest possible coupling of the drive coil 12, receive coil 14 and biasing plate 16 with the target marker M for maximum efficiency. Advantageously, such an antenna 10 is capable of distinguishing multi-ribbon/multi-frequency markers not only by the frequencies of the signals produced in response to the applied magnetic interrogation field, but also by the sequence or order of the frequencies appearing in the marker. Further, the antenna 10 provides a high signal-to-noise ratio as the drive and receive coils of the antenna are substantially perpendicular to each other thereby minimizing transformer action and reducing electromagnetic noise.

The foregoing description of a preferred embodiment has been presented for purposes of illustration and description. It is not intended to be exhaustive or to limit the invention to the precise form disclosed. Obvious modifications or variations are possible in light of the above teachings. The embodiment was chosen and described simply to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A dual antenna capable of energizing a correctly oriented, closely coupled marker providing an identifiable signal in response to an applied magnetic interrogation field and receiving the response, for utilization in card readers, product verification devices, or the like, comprising:

a substantially flat elongated drive coil defining a longitudinal axis of the antenna, each individual winding of the drive coil extending in a plane substantially perpendicular to said longitudinal axis; and a receive coil having a plurality of loops of differing lengths in the direction of the longitudinal axis of the antenna, a first portion of each of said loops being overlapped by said drive coil, said first portion extending in a direction substantially perpendicular to the longitudinal axis of said antenna, said plurality of loops being operataive to decrease the longitudinal position sensitivity of the antenna in relation to the marker.

2. The antenna as recited in claim 1, wherein each of said loops of said received coil has a second portion remote from said drive coil.

3. The antenna as recited in claim 2, wherein each of said loops of said received coil is substantially rectangular in shape, one side of the rectangle being formed by said first portion of each of said loops overlapped by said drive coil, and a second side being formed by the second portion of each of said loops remote from and beyond an end of said drive coil.

4. The antenna as recited in claim 1, wherein said drive coil is of a length along the longitudinal axis substantially equal to the length of the marker.

5. The antenna as recited in claim 1, wherein each of said receive coil loops is substantially as wide as the marker so as to optimize the signal to noise ratio of the antenna.

6. The antenna as recited in claim 1, wherein each of said receiver loops is proportional longer than the next so as to form a uniformly stepped pattern for dividing the marker into uniform segments.

7. The antenna as recited in claim 1 wherein said of said receiver loops includes a common end.

8. The antenna as recited in claim 7, wherein said common end is remote from said drive coil.

9. The antenna as recited in claim 1, further including a substantially flat winding template for the drive and receive coils.

10. The antenna as recited in claim 9, wherein said template includes a substantaially U-shaped slot for receiving said first portion of said receive coil loop.

11. The antenna as recited in claim 9, wherein said receive coil is wound around said template and overlapping said first portion of said receive coil loop.

12. The antenna as recited in claim 9, wherein said receive coil comprises a plurality of loops of differing lengths in direction of the longitudinal axis of said antenna and said template includes an equal number of U-shaped slots, each slot receiving said first portion of one loop.

13. The antenna as recited in claim 9, wherein series of receive coils are provided side-by-side transversely across said template so as to allow simultaneous interrogation of multiple frequency markers in sequence.

14. The antenna as recited in claim 13, wherein a single drive coil is wound around said template and said first portion of each of said series of receive coils.

15. The antenna as recited in claim 9, wherein said template is composed of non-metallic magnetic material capable of providing a bias field for activating the marker.

16. The antenna as recited in claim 15, wherein said non-metallic magnetic material of the template is barium ferrite mixed with a plastic binder.

17. The antenna as recited in claim 16, wherein said plastic binder is polyethylene.

18. The antenna as recited in claim 17, wherein said template is substantially 20% barium ferrite and 80% plastic by volume.

19. The antenna as recited in claim 9, wherein said winding template defines the longitudinal axis of the antenna and includes a first end for retaining a second portion of said receive coil loop at a predetermined distance from said drive coil; said drive coil being wound around said template.

20. The antenna as recited in claim 19, wherein said first end includes a reduced section to retain the second portion of said receive coil.

21. The antenna as recited in claim 20, wherein said template includes a substantially U-shaped slot for receiving said first portion of said receive coil.

22. A dual antenna capable of energizing a correctly oriented, closely coupled marker providing an identifiably signal in response to an applied magnetic interrogation field and receiving the response, for utilization in card readers, product verification devices, or the like, comprising:

a substantially flat elongated drive coil defining a longitudinal axis of the antenna;

a receive coil having a plurality of loops of differing lengths in the direction of the longitudinal axis of the antenna to decrease the longitudinal position sensitivity of the antenna in relation to the marker, and a substantially flat plate adjacent said coils and forming a part of said antenna;

said plate including magnetic material to provide a dc bias to activate said marker.

23. The antenna as recited in claim 22 wherein said plate forms a template for winding of said coils.

24. The antenna as recited in claim 22 wherein said plate is substantially 20% barrium ferrite and 80% plastic by volume.

* * * * *